(12) United States Patent
Carnevali et al.

(10) Patent No.: US 7,525,696 B2
(45) Date of Patent: Apr. 28, 2009

(54) LOCKING HOLSTER FOR UPC SCANNER

(76) Inventors: Jeffrey D. Carnevali, 5957 Beach Dr. SW., Seattle, WA (US) 98136; Armando D. Carnevali, 3250-36th Ave. SW., Seattle, WA (US) 98136

(*) Notice: Subject to any disclaimer, the term of this patent is extended or adjusted under 35 U.S.C. 154(b) by 1074 days.

(21) Appl. No.: 10/862,641

(22) Filed: Jun. 7, 2004

(65) Prior Publication Data

US 2005/0269473 A1  Dec. 8, 2005

(51) Int. Cl.
- *H04N 1/024* (2006.01)
- *H04N 1/04* (2006.01)
- *H04N 1/46* (2006.01)

(52) U.S. Cl. .......... 358/473; 358/474; 358/505

(58) Field of Classification Search ........ 358/474, 358/473, 505; 382/312–315, 321; 248/311.2, 248/314, 316.1, 313, 903, 309.1; 224/411, 224/926; 235/462.45, 462.43; D7/620, 625; 297/188.04, 248, 188.06, 188.11, 188.12, 297/188.2; 379/455, 426; 220/737, 903; 206/254; 108/50.11, 50.12; 211/32

See application file for complete search history.

(56) References Cited

U.S. PATENT DOCUMENTS

| | | | |
|---|---|---|---|
| 4,878,642 A | * | 11/1989 | Kirby, Jr. .............. 248/311.2 |
| 5,200,597 A | | 4/1993 | Eastman et al. |
| 5,508,505 A | | 4/1996 | Walts et al. |
| 5,576,531 A | | 11/1996 | Murphy |
| 5,588,055 A | * | 12/1996 | Williamson et al. ......... 379/426 |
| D377,886 S | * | 2/1997 | Colton ..................... D7/620 |
| 5,687,874 A | * | 11/1997 | Omori et al. ............... 220/737 |
| 5,709,429 A | * | 1/1998 | Bergin ................... 297/188.04 |
| 5,845,885 A | | 12/1998 | Carnevali |
| 5,860,559 A | * | 1/1999 | Wang ...................... 220/737 |
| 6,039,206 A | * | 3/2000 | DeFrancesco ............. 220/737 |
| 6,644,524 B1 | * | 11/2003 | Garvin ................... 248/311.2 |
| 6,672,554 B2 | * | 1/2004 | Fukuo ................... 248/311.2 |
| 6,802,265 B1 | * | 10/2004 | Dodson et al. ........... 108/50.11 |

* cited by examiner

*Primary Examiner*—Houshang Safaipour
(74) *Attorney, Agent, or Firm*—Charles J. Rupnick Attorney at Law

(57) ABSTRACT

A holster for securing a portable handheld UPC bar code scanner, the holster being formed of a rigid elongated tubular receptacle having an insertion opening in one end that communicates with an elongated tubular cavity formed therein, the insertion opening being formed with a bar code scanner head support portion which is canted at an angle relative to a longitudinal axis of the receptacle cavity. A rigid lever rotatably mounted on the receptacle under the insertion opening partially occludes a portion of the receptacle cavity when biased relative to the receptacle.

20 Claims, 3 Drawing Sheets

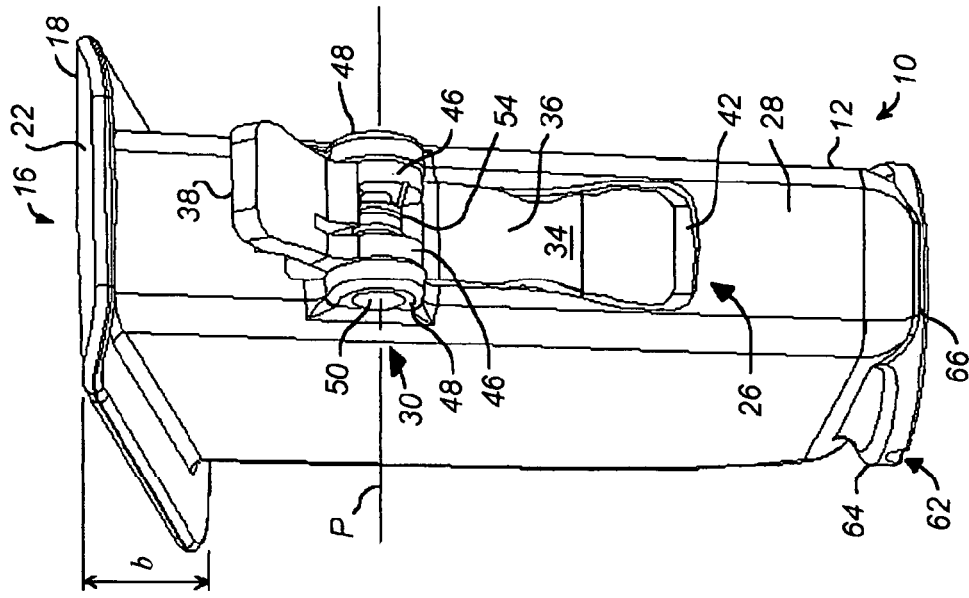
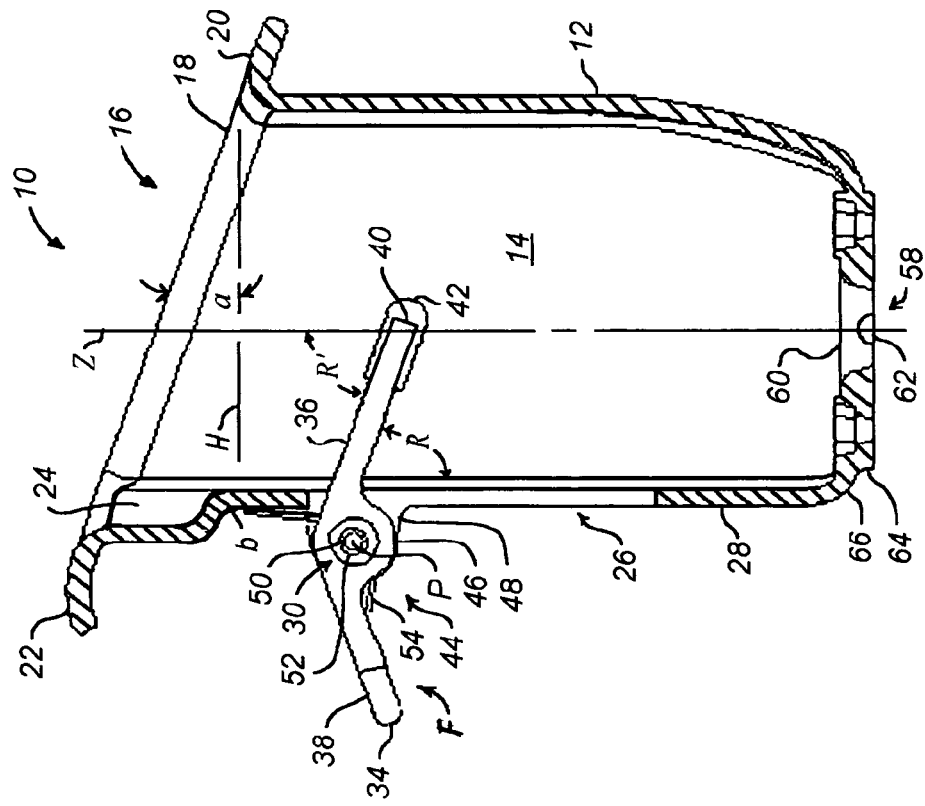
Fig. 3
Fig. 2

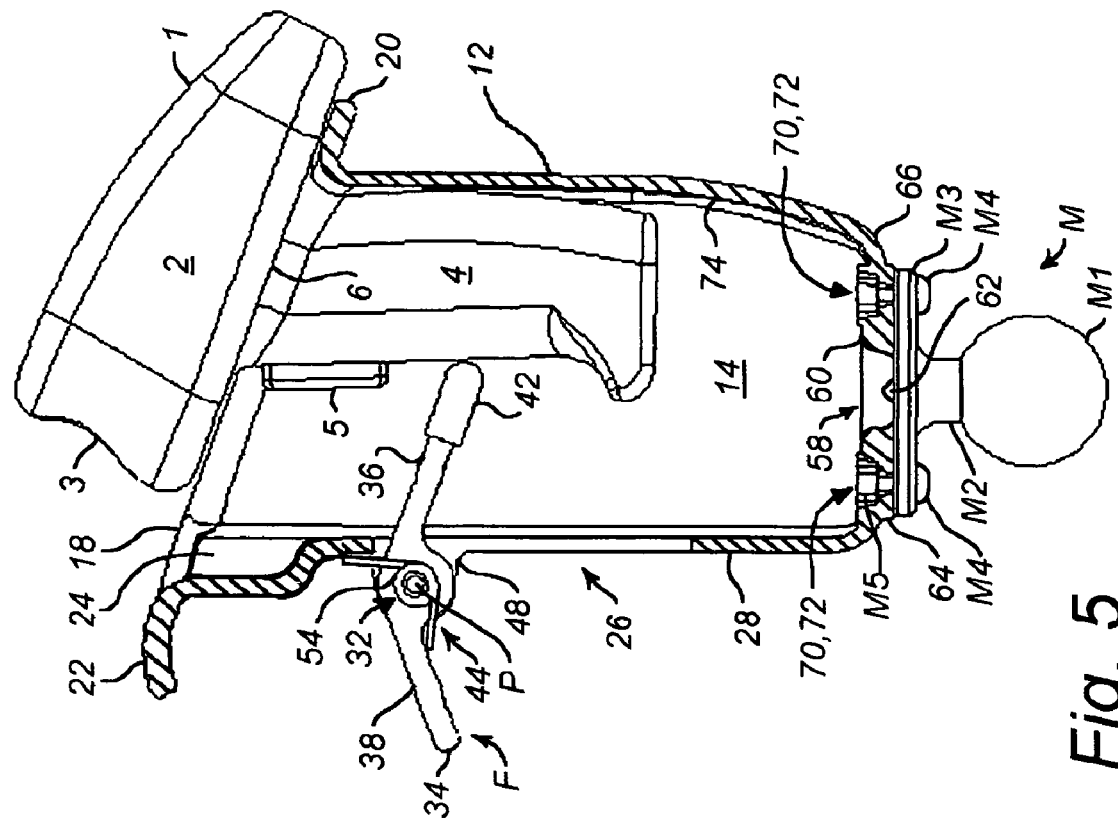
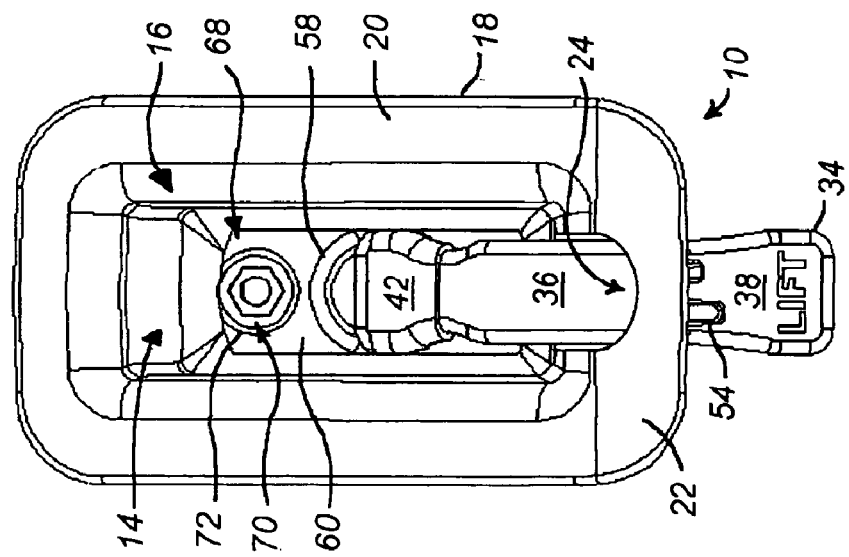
Fig. 5
Fig. 4

LOCKING HOLSTER FOR UPC SCANNER

FIELD OF THE INVENTION

The present invention relates to a holster for securing a portable electronic device, and in particular to a holster for securing a portable UPC bar code scanner.

BACKGROUND OF THE INVENTION

Handheld portable bar code scanners having pistol-type grips are generally well-known. Some such pistol-grip portable scanners are illustrated in U.S. Pat. No. 5,200,597, "Digitally Controlled System For Scanning And Reading Bar Codes" issued to Eastman, et al. on Apr. 6, 1993, U.S. Pat. No. 5,508,505, "Holder For Handheld Portable Bar Code Scanner" issued to Walts, et al. on Apr. 16, 1996, and U.S. Pat. No. 5,576,531, "Hand Held Bar Code Scanning Device Having A Manually Operated Optical Trigger Switch" issued to Murphy on Nov. 19, 1996, all of which are incorporated herein by reference. These and other portable scanners are often protected by rugged impact-resistant plastic housings for use in the field, for example, in warehouses, factories, and storerooms. Such field environments, however, are often hazardous for electronic devices, even when housed in rugged plastic. Portable devices are easily misplaced, and if set down in a traffic area, may become lost or crushed under vehicles or inventory.

SUMMARY OF THE INVENTION

The present invention is a holster that overcomes limitations of the prior art for securing a portable handheld UPC bar code scanner. Accordingly, the holster includes a rigid elongated tubular receptacle having an insertion opening in one end that communicates with an elongated tubular cavity formed therein. By example and without limitation, the insertion opening is formed with a bar code scanner head support portion embodied in an outwardly flared lip a portion of which is canted at an angle relative to the longitudinal axis of the receptacle cavity. At least the angularly canted portion of the insertion opening is structured to support a head portion of the bar code scanner above the handle. A portion of the insertion opening has formed therein a relief structured to pass a trigger situated on a surface the bar code scanner handle. A rigid lever is rotatably mounted on one wall of the receptacle under the portion of the insertion opening containing the relief structure, the lever including a rigid operating portion for partially occluding a portion of the cavity. Means are provided for spring biasing the lever relative to the receptacle such that the operating portion of the lever partially occludes a portion of the cavity. Furthermore, the receptacle's tubular cavity is sized to accept the handle portion of the portable handheld UPC bar code scanner therein in combination with the lever operating portion being canted at an angle between about 45 degrees and perpendicular to a longitudinal axis of the receptacle cavity when biased by the spring biasing means.

According to one aspect of the invention, one end of the operating portion of the lever distal from the spring biasing means includes a resiliently compressible elastomeric material suitable for protecting the handle of the bar code scanner, which is usually plastic, while providing a frictional surface suitable for resisting a tendency of the scanner handle to slide along an end surface of the operating arm. Furthermore, the lever also includes a rigid user control portion that is spaced on an opposite side of the spring biasing means from the rigid operating portion.

Other aspects of the invention are detailed herein.

BRIEF DESCRIPTION OF THE DRAWINGS

FIG. 2 is a cross-sectional view of the locking holster of the invention taken through the receptacle and illustrates the novel spring biased locking mechanism of the invention;

FIG. 3 is a pictorial end view of the locking holster of the invention looking at the receptacle wall having the spring biased locking mechanism of the invention in a keyhole aperture;

FIG. 4 is a plan view of the locking holster of the invention looking down at the scanner insertion opening and surrounding scanner head support surface; and FIG. 5 is another cross-sectional view of the locking holster of the invention with the UPC bar code scanner device installed and secured by the novel locking mechanism of the invention.

DETAILED DESCRIPTION

Figure 1:
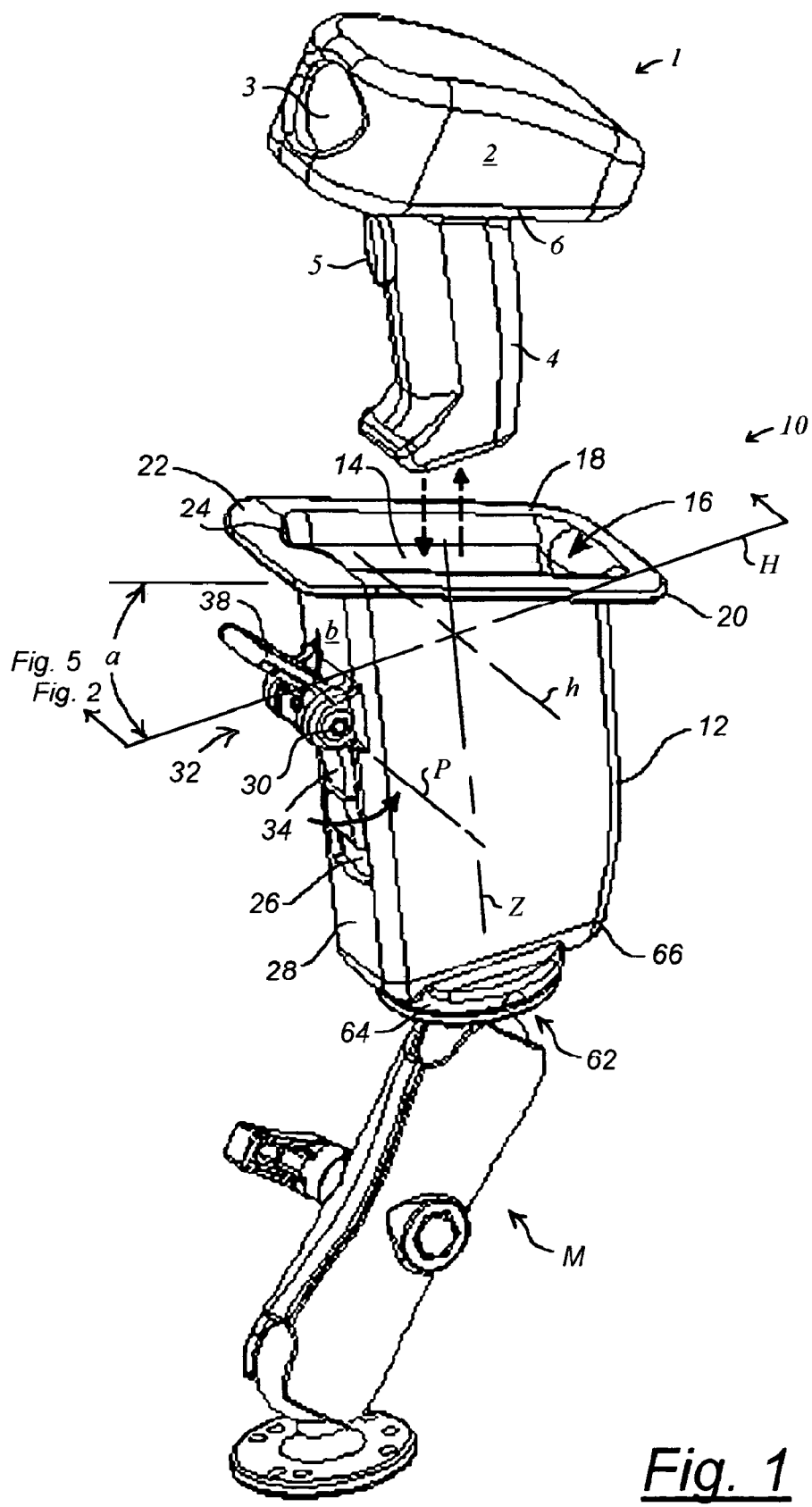
FIG. 1 illustrates one embodiment of the locking holster of the invention for securing a conventional handheld portable UPC bar code scanner of a type well-known in the art.

The foregoing aspects and many of the attendant advantages of this invention will become more readily appreciated as the same becomes better understood by reference to the following detailed description, when taken in conjunction with the accompanying drawings, wherein:

By example and without limitation the present invention is embodied as a holster for securing a portable UPC bar code scanner, the holster having an elongated tubular receptacle that is structured for being permanently attached to an external structure, the receptacle being of generally rectangular cross-section and forming an interior elongated tubular cavity sized to accept a handle portion of one or more different handheld UPC bar code scanners and having at one end a insertion opening rotated about the short axis of the rectangle at an angle of about 15 degrees to the long axis of the rectangle, i.e., an angle of about 75 degrees to the longitudinal axis of the elongated tubular receptacle, with the insertion opening being embodied in an outwardly flared lip formed by a curved flange that is structured to support a head portion of the bar code scanner above the handle and having formed therein a relief structured to pass a trigger situated on a surface the bar code scanner handle, and an aperture formed in a face or wall of the receptacle that contains the base of the angle formed by the canted insertion opening and having a pivot formed on the receptacle wall adjacent to the base of the angle and spaced away from the insertion opening by the base of the angle; and a locking mechanism embodied in a rigid lever that is structured to rotate about the pivot, the lever having an operating arm on one side of the pivot that is sized to pass through the aperture in the face of the receptacle and having a user control arm on an opposite side of the pivot from the operating arm, the lever being biased to cause the operating arm to enter and at least partially occlude the interior of the receptacle, whereby an extreme end surface of the lever operating arm distal from the pivot operates under pressure to contact the surface the bar code scanner handle below the trigger with the lever operating portion being canted at an angle between about 45 degrees and perpendicular to a longitudinal axis of the receptacle cavity.

According to one embodiment of the invention, the extreme end surface of the lever operating arm that contacts the bar code scanner handle includes a resilient compressible elastomeric material that increases a coefficient of friction with which the lever operating arm contacts the bar code scanner handle, while protecting the bar code scanner handle from damage potentially caused by the contact.

According to one embodiment of the invention, the receptacle structure includes a second opening opposite the insertion opening for draining the receptacle of water or other liquid that might otherwise become entrapped therein to the detriment of the bar code scanner.

According to one embodiment of the invention, the receptacle structure includes means for attaching it to an external support. By example and without limitation, the means for attaching the receptacle to an external support is embodied as a pair of fastener through holes in a face of the receptacle structure opposite the insertion opening, each of the fastener through holes being sized to pass a threaded fastener therethrough and being formed with a relief on an interior surface of the face that is structured to capture a nut sized to mate with the threaded fastener. According to one embodiment of the invention, the pair of fastener through holes are used to attach a ball-shaped coupler of a universally positionable mounting device of the type disclosed in U.S. Pat. No. 5,845,885, UNIVERSALLY POSITIONABLE MOUNTING DEVICE, which was issued to the inventor of the present invention and is incorporated herein by reference.

FIG. 1 illustrates one embodiment of the invention for securing a conventional handheld portable UPC bar code scanner 1 of a type well-known in the art, as described by example and without limitation in U.S. Pat. No. 5,576,531, HAND HELD BARCODE SCANNING DEVICE HAVING A MANUALLY OPERATED OPTICAL TRIGGER SWITCH, and U.S. Pat. No. 5,508,505, HOLDER FOR HANDHELD PORTABLE BAR CODE SCANNER, both of which are incorporated herein by reference.

The handheld portable UPC bar code scanner device 1 includes a head 2 having a bar code scanner 3 installed therein. A handle 4 containing a trigger mechanism 5 intersects the head 2 at a shoulder surface 6 of the bottom of the head 2 by which the scanner device 1 is supported by the user's hand when the handle 4 is enclosed in the user's fingers.

In FIG. 1, the invention is embodied by example and without limitation as a holster 10 for securing the handheld portable UPC bar code scanner device 1, having an elongated receptacle 12 that is structured for being permanently attached to an external structure, the receptacle 12 is integrally formed of four co-joined exterior walls enclosing by example and without limitation a generally rectangular cross-section interior cavity 14 sized to accept the handle portion 4 of one or more different handheld UPC bar code scanners 1 and having at one end a insertion opening 16 rotated about the short axis h of the rectangle at an angle a of about 15 degrees to the long axis H of the rectangle. However, the value of about 15 degrees for the angle a is only by example, the insertion opening 16 is alternatively formed perpendicular to a vertical or longitudinal axis Z of the receptacle 12 (shown in FIG. 2), or alternatively is rotated by the angle a up to about 30 degrees. A scanner head support surface 18 is embodied by example and without limitation in an outwardly flared lip 20 contiguous with the angled insertion opening 16 and formed by a curved flange structured to support the head portion 2 of the bar code scanner 1 above the handle 4. As better illustrated in FIGS. 2 and 3, a leading portion 22 of the flared lip 16 is optionally tipped down relative to the majority angled portion of the scanner head support surface 18 to be approximately perpendicular to the rectangular cross-section of the receptacle 12. This optional tipped portion 22 operates as a relief in the support surface 18 for inserting the user's fingers between the support surface 18 and the scanner head portion 2 for retrieving the bar code scanner 1. The leading and optionally tipped portion 22 of the flared lip 16 includes a relief 24 embodied by example and without limitation as a groove structured to pass the trigger 5 situated on the bar code scanner handle 4 without triggering the bar code scanner 3.

The receptacle 12 includes a keyhole aperture 26 formed in a front face or wall 28 that contains the base b of the angle a formed by the insertion opening 16 relative to the body of the receptacle 12. A locking mechanism 32 containing a means for pivoting about a pivot 30 that defines a pivot axis P that is parallel to the short axis h of the rectangle is formed on the receptacle wall 28 adjacent to the base b of the angle a and is spaced away from the insertion opening 16 by the base b. The locking mechanism 32 is embodied by example and without limitation in a rigid lever 34 that is structured to rotate about the pivot axis P for releasably locking the handle 4 of the scanner 1 and thereby securing the scanner 1 relative to the receptacle 12.

FIG. 2 is a cross-sectional view of the holster 10 taken along the long axis H of the receptacle 12 and illustrates the locking mechanism 32 embodied by example and without limitation in the rigid lever 34 having an operating arm 36 on one side of the pivot axis P and a control arm 38 on an opposite side of the pivot axis P from the operating arm 36. The operating arm 36 is sized to pass through the keyhole aperture 26 in the face 28 of the receptacle 12 and engage the handle 4 of the installed bar code scanner 1, as illustrated in FIG. 5 and discussed in detail below. The locking mechanism 32 is inwardly biased, as indicated by the arrow, to cause the operating arm 36 to enter and at least partially occlude the interior cavity 14 of the receptacle 12, whereby an extreme end surface 40 of the lever operating arm 36 distal from the pivot axis P operates under pressure to contact a surface the bar code scanner handle 4 below the trigger 5. The operating arm 36 of the inwardly biased locking mechanism 32 rotates about the pivot axis P by an angle R of about 45 degrees to about 90 degrees relative to the vertical face or wall 28 of the receptacle 12. By inspection, the rotation of the operating arm 36 about the pivot axis P causes the operating arm 36 to form an angle R' with the vertical axis Z of the receptacle 12 that is reciprocal to the angle R and of equal magnitude, i.e., about 45 degrees to about 90 degrees relative to the vertical axis Z.

By example and without limitation the lever portion 34 of the locking mechanism 32 is formed like a teeter-totter having the operating and control arms 36, 38 integrally formed as a rigid beam or plank, the operating and control arms 36, 38 being optionally rotated or bent at a small angle relative to one another (shown), and the end surface 40 of the operating arm 38 is optionally covered with a tip 42 formed of rubber or another resiliently compressible elastomeric material suitable for protecting the plastic bar code scanner 1 from scratching while providing a frictional surface suitable for resisting any tendency for the scanner handle 4 to slide along the end surface 40 of the operating arm 38. The operating arm 38 is optionally adjustable in length between the pivot axis P and its end surface 40 as a function of the UPC bar code scanner device 1 to be accommodated, i.e., as a function of the thickness or depth of the device handle 4. The length of the operating arm 38 is preferably adjusted to cause engagement of the end surface 40 or tip 42 (if present) with the UPC bar code scanner handle 4 when the operating arm 38 is rotated about the pivot axis P by an angle R of about 75 degrees to about 90 degrees, as discussed herein. The tip 42 is optionally formed by over molding or otherwise coating the end surface 40 and an adjacent portion of the operating arm 38 with rubber or another suitable resiliently compressible elastomeric material. The means for pivoting about the pivot axis P is, by example and without limitation, a fulcrum 44 that is formed at the pivot point P and is structured for pivoting the lever 34 about the pivot point P. By example and without limitation, the fulcrum 44 is embodied as one or more hubs 46 formed on the lever 34 and one or more bosses 48 formed on the receptacle wall 28 with a hinge pin 50 rotatably interlocking the hubs 46 and bosses 48 for rotation of the lever 34 about the pivot axis P relative to the receptacle 12. By example and without limitation, each of the one or more hubs 46 is formed as outward projection of the lever 34 at the juncture of the operating and control arms 36, 38 and is structured with a through hole 52 that is sized for the hinge pin 50 to slide through. The one or more bosses 48 on the receptacle 12 are formed, by example and without limitation, as a pair of bosses 48 on the wall 28 spaced apart on opposite sides of the keyhole aperture 26 with each of the bosses 48 being formed with one of the through holes 52 that is sized for the hinge pin 50 to slide through. According to one embodiment of the invention, the bosses 48 are formed at an upper portion of the receptacle 12 adjacent to the base b of the angle a and spaced away from the insertion opening 16 by the length of the base b. This position of the bosses 48 on the receptacle wall 28 locates the lever 34 relative to the receptacle's scanner head support surface 18 such that the lever's operating arm 36 engages the scanner 1 high on the handle 4 but below the trigger 5. The extreme end surface 40 of the lever operating arm 36 is thus afforded the maximum purchase on the handle 4 without interfering with the trigger 5.

According to one embodiment of the invention, the hubs 46 of the lever 34 are positioned between the spaced apart bosses 48 with through holes 52 in the hubs 46 being aligned with the through holes 52 of the bosses coincident with the pivot axis P. The hinge pin 50 inserted in the through holes 52 of both the lever's hubs 46 and the receptacle's bosses 48 permits the lever 34 to rotate about the pivot axis P relative to the receptacle 12.

According to one embodiment of the invention, a biasing means 54, by example and without limitation embodied as a hinge spring (shown) or other suitable spring, inwardly biases the lever's operating arm 36 to enter and at least partially occlude the interior cavity 14 of the receptacle 12. When embodied as a hinge spring, the spring 54 encircles the hinge pin 52 and is thereby maintained in position with one of its legs pressing against a surface of the lever 34 and the other leg pressing against the receptacle wall 28. The exact means by which the hinge spring 54 interfaces with the lever 34 and receptacle 12 depends upon the configuration of the receptacle 12, lever 34 and hinge spring 54. Furthermore, illustration herein of the spring 54 as a hinge spring is not intended to operate as a limitation on the claimed invention, Rather, the spring 54 is optionally embodied as a different spring type, such as a coil spring, which may be substituted for the hinge spring to inwardly bias the operating arm 36 of the lever 34. As embodied in FIG. 2, an upward force F exerted on the underside of the lever's control arm 38 overcomes the inward bias supplied by the spring 54 and retracts the operating arm 36 from occluding the receptacle interior cavity 14.

FIG. 3 is an end view of the holster 10 of the invention looking at the receptacle wall 28 which shows the keyhole aperture 26 having the bosses 48 formed on opposite sides thereof and at an upper portion of the receptacle 12 spaced away from the scanner head support surface 18 surrounding the insertion opening 16 by the length of the base b. As illustrated in FIG. 3, the hinge pin 50 passes through both the lever's hubs 46 and the receptacle's bosses 48 and thereby permits the lever 34 to rotate about the pivot axis P relative to the receptacle 12. According to one embodiment of the invention, the hinge pin 50 is embodied by example and without limitation as a threaded fastener in combination with a threaded retainer, i.e., a nut, that is threaded onto one end opposite the fastener's head to secure the hinge pin 50 relative to the lever's hubs 46 and the receptacle's bosses 48. The threaded retainer is embodied by example and without limitation as a conventional locking type nut. The hinge pin 50 simultaneously secures the spring 54 relative to the receptacle 12 and lever 34 for biasing the operating arm 36 of the lever 34 inwardly of the receptacle 12 through the keyhole aperture 26.

FIG. 4 is a plan view of the holster 10 of the invention looking down at the insertion opening 16 and surrounding scanner head support surface 18 wherein the operating arm 36 of the lever 34 is shown partially occluding the interior cavity 14 of the receptacle 12 when biased inwardly of the receptacle 12. FIG. 4 also illustrates a drain opening 58 in the floor 60 of the receptacle 12 opposite from the insertion opening 16 for draining the receptacle 12 of water or other liquid or debris that might otherwise become entrapped therein to the detriment of the bar code scanner 1. The drain opening 58 is optionally enhanced with one or more crosswise channels 62 structured to flow drainage across a flanged portion 64 of the base 66 of the receptacle 12 when a mounting apparatus M (shown in FIGS. 1, 5) is mounted to the receptacle base 66 and would otherwise block the drain opening 58.

FIG. 4 also illustrates one means 68 for attaching a mounting apparatus M to the receptacle base 66. By example and without limitation, the attaching means 68 is embodied as a pair of through holes 70 formed through the floor 60 of the receptacle 12, each through hole 70 being formed in combination with a complementary depression 72 in the floor 60 that is sized to accept a square or hex nut (shown) and shaped to resist rotation of the nut during tightening of a complementary threaded fastener (shown in FIG. 5).

FIG. 5 is another cross-sectional view of the holster 10 taken along the long axis H of the receptacle 12 with the UPC bar code scanner device 1 installed and secured by the locking mechanism 32. As illustrated, with the scanner's handle 2 inserted into the interior cavity 14 of the receptacle, the shoulder surface 6 of the bottom of the scanner head 2 rests on the outwardly flared lip 20 of the support surface 18 around the edge of the insertion opening 16. The operating arm 36 of the rigid lever 34 is inwardly biased by the biasing means 54 operating through the keyhole aperture 26 against the receptacle wall 28. As illustrated in FIG. 5, the operating arm 36 is sufficiently elongated relative to the long axis H of the receptacle 12 to encounter the handle 4 of the scanner 1 and compress it against an interior surface of a back face or wall 74 of the receptacle 12 opposite from the front wall 28 that supports the locking mechanism 32.

The inward biasing pressure exerted by the biasing means 54 on the locking mechanism 32 causes the operating arm 36 to rotate about the pivot axis P and engage the surface of the scanner's handle 4 at a point beneath the trigger 5. The biasing means 54 wedges the extreme end surface 40 of the lever's operating arm 36, including the optional protective tip 42 if present, against the handle 4 and thereby effectively locks the bar code scanner 1 within the confines of the receptacle interior cavity 14. If present, the spongy elastomeric protective tip 42 of the rigid lever's operating arm 36 effectively increases the coefficient of friction with which the lever operating arm 36 contacts the bar code scanner handle 4, while protecting the handle 4 from damage potentially caused by the contact.

According to one embodiment of the invention, the mounting apparatus M is mounted to the receptacle base 66 of the receptacle 12 for attaching the holster 10 to an external support. According to one embodiment of the invention as illustrated in FIG. 1, the mounting apparatus M is embodied as a ball-shaped coupler of a universally positionable mounting device of the type disclosed in U.S. Pat. No. 5,845,885, which is incorporated herein by reference. Accordingly, the mounting apparatus M includes a part-spherical ball shaped head M1 formed of a pressure deformable elastomeric material and positioned upstanding on a reduced diameter neck M2 from a disc-shaped base M3. Threaded fasteners M4 secured by nuts M5, which may be lock nuts, secure the mounting apparatus base M3 to the holster base 66. The holster 10 of the invention can thereafter be mounted on an external support by means of the universally positionable mounting device of the type disclosed in U.S. Pat. No. 5,845,885 and shown in FIG. 1.

While the preferred embodiment of the invention has been illustrated and described, it will be appreciated that various changes can be made therein without departing from the spirit and scope of the invention. For example, materials may be substituted for the different components of the flexible support apparatus of the invention without departing from the spirit and scope of the invention. Therefore, the inventor makes the following claims.

What is claimed is:

1. A holster for securing a portable UPC bar code scanner, the holster comprising:
    a rigid elongated tubular receptacle forming an elongated tubular cavity with an insertion opening into one end of the tubular cavity;
    a unitary rigid lever rotatably coupled to the receptacle wall and situated adjacent to the insertion opening into the end of the tubular cavity, an operating portion of the lever being movable into a position partially occluding the cavity;
    a biasing member coupled for biasing the operating portion of the lever into the position partially occluding the cavity; and
    wherein a control portion of the unitary rigid lever is operable for moving the operating portion of the lever away from the position partially occluding the cavity.

2. The holster of claim 1 wherein the tubular receptacle further comprises a keyhole aperture formed in one wall of the tubular receptacle adjacent to the insertion opening and being isolated from the insertion opening by a substantially continuous lip portion contiguous with the insertion opening; and
    wherein the control portion of the lever is positioned externally of the tubular cavity, and the lever is further operable through the keyhole aperture.

3. The holster of claim 2 wherein the fulcrum further comprises a pair of bosses outwardly projected from the receptacle wall, and a hinge pin coupled between the bosses and the lever.

4. The holster of claim 2 wherein the lever further comprises an operating arm and a control arm positioned on opposite sides of the fulcrum.

5. The holster of claim 1 wherein the biasing member further comprises a spring positioned for spring loading the lever relative to the receptacle.

6. The holster of claim 1 wherein the elongated tubular cavity further comprises a drain opening in a floor portion thereof.

7. The holster of claim 2 wherein the substantially continuous lip portion further comprises an outwardly flared lip structured to support a head portion of the bar code scanner.

8. The holster of claim 7 wherein the insertion opening is further angled relative to a longitudinal axis of the tubular cavity.

9. A holster for securing a portable UPC bar code scanner, the holster comprising:
    a rigid receptacle having an insertion opening in one end thereof and communicating with a tubular cavity formed therein, a substantially continuous lip portion contiguous with the insertion opening, and a keyhole aperture isolated in one wall of the tubular receptacle communicating with the tubular cavity thereof;
    a unitary rigid lever rotatably mounted on one wall of the receptacle externally of the tubular cavity thereof and including both a rigid operating portion projected through the keyhole aperture of the receptacle for partially occluding a portion of the cavity and a rigid control portion for moving the operating portion relative to the cavity;
    a spring biasing the operating portion of the lever relative to the receptacle into a position at least partially occluding the cavity; and
    wherein the tubular cavity is sized to accept a handle portion of a portable UPC bar code scanner therein in combination with the lever operating portion being canted at an angle to a longitudinal axis of the receptacle cavity when biased by the spring.

10. The holster of claim 9 wherein an end of the operating portion of the lever distal from the spring further comprises a resiliently compressible elastomeric material suitable for protecting the handle of the bar code scanner while providing a frictional surface suitable for resisting a tendency of the scanner handle to slide along an end surface of the operating portion.

11. The holster of claim 9 wherein the insertion opening is further canted at an angle relative to the longitudinal axis of the receptacle cavity.

12. The holster of claim 9 wherein the rigid control portion of the lever further is further spaced on an opposite side of the biasing spring from the rigid operating portion.

13. The holster of claim 9 wherein the tubular cavity is further sized to accept the handle portion of a portable UPC bar code scanner therein in combination with the lever operating portion being canted at an angle between 45 degrees and perpendicular to the longitudinal axis of the receptacle cavity when biased by the biasing spring.

14. A holster for securing a portable UPC bar code scanner, the holster comprising:
    a) an elongated receptacle that is structured for being permanently attached to an external structure, the receptacle comprising:
        i) a cavity of generally rectangular interior cross-section sized to accept a handle portion of different handheld UPC bar code scanners through an insertion opening situated at one end of the receptacle,
        ii) the insertion opening being rotated about a short axis of the rectangle at an angle to a long axis of the rectangular cavity and having an outwardly flared lip structured to support a head portion of the bar code scanner, and
        iii) an aperture formed in one face of the receptacle containing the base of the angle formed between the insertion opening and the long axis of the rectangular cavity;
    b) a locking mechanism structured on the face of the receptacle containing the aperture, the locking mechanism comprising a rigid lever structured to rotate about a pivot axis situated adjacent to the aperture and spaced away from the insertion opening by the base of the angle formed between the insertion opening and the long axis of the rectangular cavity, the lever having an operating arm formed on one side of the pivot axis and sized to pass through the aperture in the face of the receptacle, and a control arm on an opposite side of the pivot axis from the operating arm; and c) means for biasing the lever to cause the operating arm to enter and at least partially occlude the interior of the receptacle.

15. The holster of claim 14 wherein the locking mechanism further comprises a fulcrum containing the pivot axis.

16. The holster of claim 15 wherein the fulcrum further comprises one or more bosses formed on an external surface of the face of the receptacle containing the aperture, one or more hubs formed on the lever between the operating and control arms, and a hinge pin suspending the one or more hubs for rotation relative to the one or more bosses.

17. The holster of claim 14 wherein an end of the operating arm distal from the pivot axis comprises a protective tip.

18. The holster of claim 14 wherein the means for biasing the lever further comprises a spring operating between the lever and the receptacle.

19. The holster of claim 14 wherein the angle by which the insertion opening is rotated relative to the long axis of the rectangular cavity further comprises an angle of approximately 15 degrees.

20. The holster of claim 14 wherein the insertion opening further comprises a relief formed in the outwardly flared lip adjacent to the base of the angle formed between the insertion opening and the long axis of the rectangular cavity, the relief being structured to pass a trigger situated on a surface the bar code scanner handle.

* * * * *